United States Patent [19]

Toyosawa et al.

[11] Patent Number: 5,371,451
[45] Date of Patent: Dec. 6, 1994

[54] PREDICTIVE REPETITION CONTROL METHOD FOR A SERVO MOTOR AND AN APPARATUS THEREFOR

[75] Inventors: Yukio Toyosawa; Naoto Sonoda, both of Kumamoto, Japan

[73] Assignee: Fanuc Ltd., Yamanashi, Japan

[21] Appl. No.: 965,400

[22] PCT Filed: Apr. 20, 1992

[86] PCT No.: PCT/JP92/00506
§ 371 Date: Dec. 18, 1992
§ 102(e) Date: Dec. 18, 1992

[87] PCT Pub. No.: WO92/20019
PCT Pub. Date: Nov. 12, 1992

[30] Foreign Application Priority Data
Apr. 24, 1991 [JP] Japan .................. 3-119074

[51] Int. Cl.$^5$ .................................. G05B 19/00
[52] U.S. Cl. ........................... 318/568.13; 364/165
[58] Field of Search ............ 318/564, 568.13, 568.22, 318/609, 610, 649; 364/164, 165, 167.01, 474.12, 474.13, 474.33

[56] References Cited

U.S. PATENT DOCUMENTS

| | | | |
|---|---|---|---|
| 4,533,991 | 8/1985 | Georgis | 364/164 |
| 4,912,753 | 3/1990 | Evans, Jr. | 364/167.01 |
| 4,914,365 | 4/1990 | Murakami et al. | 318/609 X |
| 4,929,874 | 5/1990 | Mizuno et al. | 318/649 X |
| 4,940,924 | 7/1990 | Mizuno et al. | 318/561 X |
| 5,049,796 | 9/1991 | Seraji | 318/568.13 |
| 5,063,335 | 11/1991 | Baechtel et al. | 318/609 |
| 5,182,703 | 1/1993 | Yamamoto | 364/164 X |

FOREIGN PATENT DOCUMENTS

| | | |
|---|---|---|
| 37-12311 | 8/1962 | Japan . |
| 55-18770 | 2/1980 | Japan . |
| 63-298501 | 12/1988 | Japan . |
| 2-307104 | 12/1990 | Japan . |
| 3-78806 | 4/1991 | Japan . |

*Primary Examiner*—Jonathan Wysocki
*Attorney, Agent, or Firm*—Staas & Halsey

[57] ABSTRACT

A predictive repetition control method for a servo motor and an apparatus therefor, which can converge a positional deviation relative to a command, repeated at intervals of a predetermined period, to zero even if the command contains an asynchronous component which is not synchronous with the predetermined period. A repetitive controller 5 and an invert system feedforward controller 6 for a control object 4 are arranged in parallel in a servo control system of the servo motor. The feedforward controller 6, including a FIR digital filter, receives a future command P whose degree of advancement corresponds to an order N of the control target. Coefficients of the filter are automatically determined based on the command P to be inputted and a positional deviation $\epsilon$ so that the feedforward controller 6 itself functions as an invert system. A transfer function of the feedforward controller 6 functions as a reciprocal of a transfer function of the control object, and hence a transfer function of an output $\omega$ for the command P becomes "1", whereby the positional deviation is theoretically eliminated to become extremely small.

6 Claims, 7 Drawing Sheets

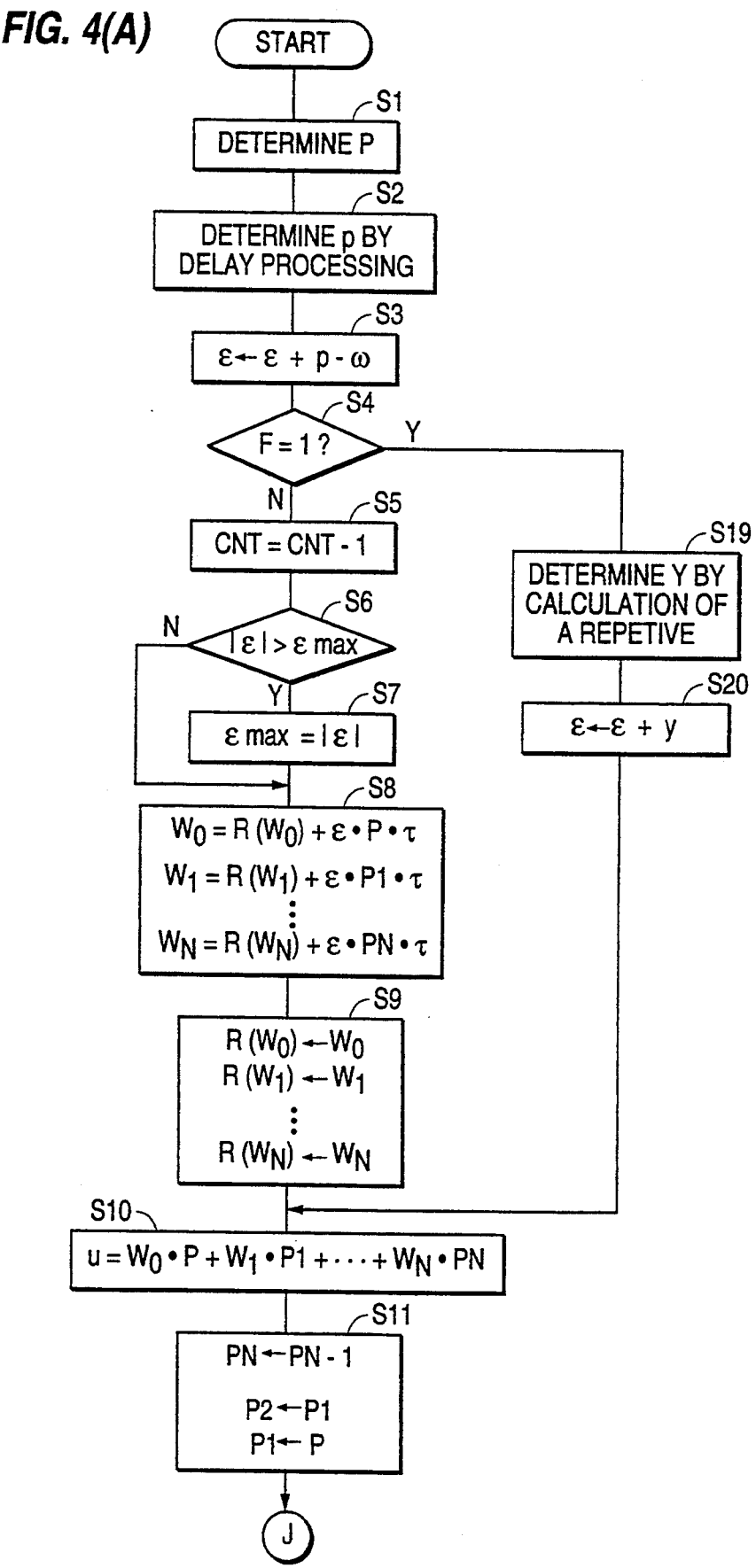

PREDICTIVE REPETITION CONTROL METHOD FOR A SERVO MOTOR AND AN APPARATUS THEREFOR

BACKGROUND OF THE INVENTION

1. Field of the Invention

The present invention relates to control for a servo motor employed for a machine tool or the like, more particularly, to a predictive repetition control method and an apparatus therefor which provides a servo motor control capable of responding with high accuracy to a command repeatedly supplied at intervals of a predetermined period even if the command contains an asynchronous component.

2. Description of the Related Art

Generally, a servo motor for controlling a machine tool is controlled so that a deviation between a move command (for example, speed or position) as a commanded input and a move amount (for example, actual speed or actual position) as an output of the servo motor is made zero. In such a servo motor control, where the input command is repeatedly supplied at intervals of a predetermined period and in the same pattern, repetitive control (or learning control) is employed to converge the control deviation to zero for accurate motor control and improving machining accuracy.

FIG. 5 (Prior Art) is a block diagram showing, by way of example, a principal part of servo motor control to which the aforementioned repetitive control is applied.

In FIG. 5, r is a speed command; E is a speed deviation between the speed command r and an actual speed $\omega$; numeral 30 is a speed loop transfer function which includes an integrator for detecting a positional deviation and executes PI (Proportional Integration) control, etc., in a conventional manner. Furthermore, in this example, a repetitive controller 20 for executing repetitive control (or learning control) is added. The controller 20 comprises a bandpass limit filter 21, a delay element 22 for storing one-period data which is repeatedly supplied at intervals of a predetermined period M, and a dynamic characteristic compensation element 23 for compensating a phase delay of the control object and lowering of gain.

At intervals of a predetermined sampling period t, the repetitive controller 20 adds data Em, delivered from the delay element 22 at the sampling time preceding by one period M, to the speed deviation E, performs the processing of the bandpass limit filter 21, and stores the resultant data in the delay element 22. The delay element 22, which has Q (=M/t) memories, is designed to store each sampling data of one period M, and output the oldest data at each sampling time. That is, at each sampling time, the delay element stores the input data in the memory of "0"th address, and outputs data stored in the (Q-1)th address, with data in each address being shifted to the next address. As a consequence, the delay element 22 can output sampling data delayed by one period M. Therefore, when a speed command r is supplied at intervals of the period M and in the same pattern, the speed deviation E and the delay element 22 are added together, and thus, data located at the same position on the pattern of the speed command r is stored as correction data.

Moreover, the output of the delay element 22 is supplied to the dynamic characteristic compensation element 23, where a phase delay and fall of the gain of the control object are compensated. Then, the delay element output is delivered as an output y of the repetitive controller 20. Further, the output y is added to the speed deviation E, and, in accordance with thus added data, the speed loop processing is carried out.

As a result, when the speed deviation E has a large value at the preceding sampling period (a sampling period immediately before a certain sampling period) while the identical pattern processing is repeated at intervals of the predetermined period M, a large output y is delivered from the repetitive controller 20 in the current sampling period, and is added to the speed deviation. Therefore, the speed deviation to be supplied to the speed loop processing varies largely, and an actual speed $\omega$ responsive to thus supplied speed deviation also varies largely, whereby the speed deviation E is corrected to be rapidly converged to zero, and this enables the motor control with high accuracy (See Japanese Laid-open Patent Publication No. H2-307104, Patent Applications Nos. H1-314154 and H2-124254).

If a command of a type shown in FIG. 5, which is to be repeated at a predetermined period, contains a frequency $f=k/M$ ($k=0, 1, 2, \ldots$), i.e., a component synchronized with the command, highly accurate response can be obtained by the repetitive control. If an asynchronous component (a frequency $f=k/M$, where a value of k is not an integer) is contained in the command, a command pattern differs by respective periods M, and so it is difficult to make the deviation zero.

SUMMARY OF THE INVENTION

An object of the present invention is to provide a predictive repetition control method and apparatus designed to converge the control deviation to zero in response to the command to be repeated at intervals of predetermined period, which are capable of converging the control deviation to zero even in response to such a command as contains an asynchronous component not synchronized with the predetermined period.

A first aspect of the present invention relates to a servo motor control method for controlling a servo motor in accordance with a move command repeatedly supplied at intervals of a predetermined period. The control method comprises the steps of: providing a feedforward controller as an inverse system for a control object; inputting to the feedforward controller a future move command whose degree of advancement is determined in accordance with the order of the control object; and adding an output from the feedforward controller to a move control output calculated on the basis of the move command, to accomplish the aforementioned object. Moreover, a repetitive controller is added to further reduce a positional deviation, thereby enabling highly accurate servo motor control. In addition, the feedforward controller comprises a FIR-type digital filter whose coefficients are automatically determined by means of adaptive control based on a future move command inputted to the feedforward controller and a positional deviation between the move command and a position feedback amount, so that the feedforward controller can function as an inverse system for the control object.

A second aspect of the present invention relates to a servo motor control apparatus for controlling a servo motor in accordance with a move command repeatedly supplied at intervals of a predetermined period, which comprises: a delay element means for receiving a move command P to generate an output y delayed from the move command by N sampling time periods, which are determined by an order N obtained by identifying a control object $G_0$; a feedback detecting means for determining a feedback amount $\omega$ associated with a moving amount of the servo motor; a feedback control means for generating a first control output v on the basis of the output p from the delay element means and the feedback amount $\omega$ from the feedback detecting means; a feedforward control means for receiving the move command P to generate a second control output u as a transfer function $Z^{-N}/G_0$ which functions as an inverse system for the control object; and a moving amount control means for controlling the moving amount of the servo motor on the basis of the first and second control outputs.

The feedforward controller is a transfer function of the inverse system of the control object, so that the product of the output of the feedforward controller and the transfer function of the control object is about "1," and thus the move command and the moving amount of the servo motor are almost equal to each other, whereby the positional deviation becomes extremely small.

According to the present invention, by arranging an inverse system feedforward controller in parallel, the positional deviation can be made extremely small to enable a highly accurate servo motor control in response to a repetitive command generated at intervals of a predetermined period, even if the repetitive command contains an asynchronous frequency component.

Furthermore, a coefficient of the invert system feedforward controller is automatically determined, so that the composition of the controller can be made simple.

DETAILED DESCRIPTION OF THE PREFERRED EMBODIMENTS

Figure 1:
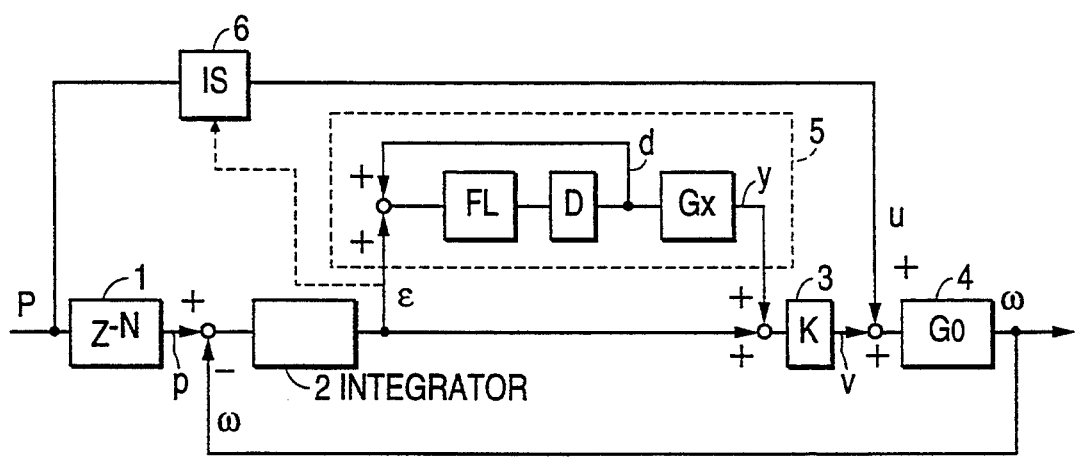
FIG. 1 is a block diagram showing a principal part of predictive repetition control according to an embodiment of the present invention.

FIG. 1 is a block diagram showing a servo motor control system according to an embodiment of the present invention.

Figure 6:
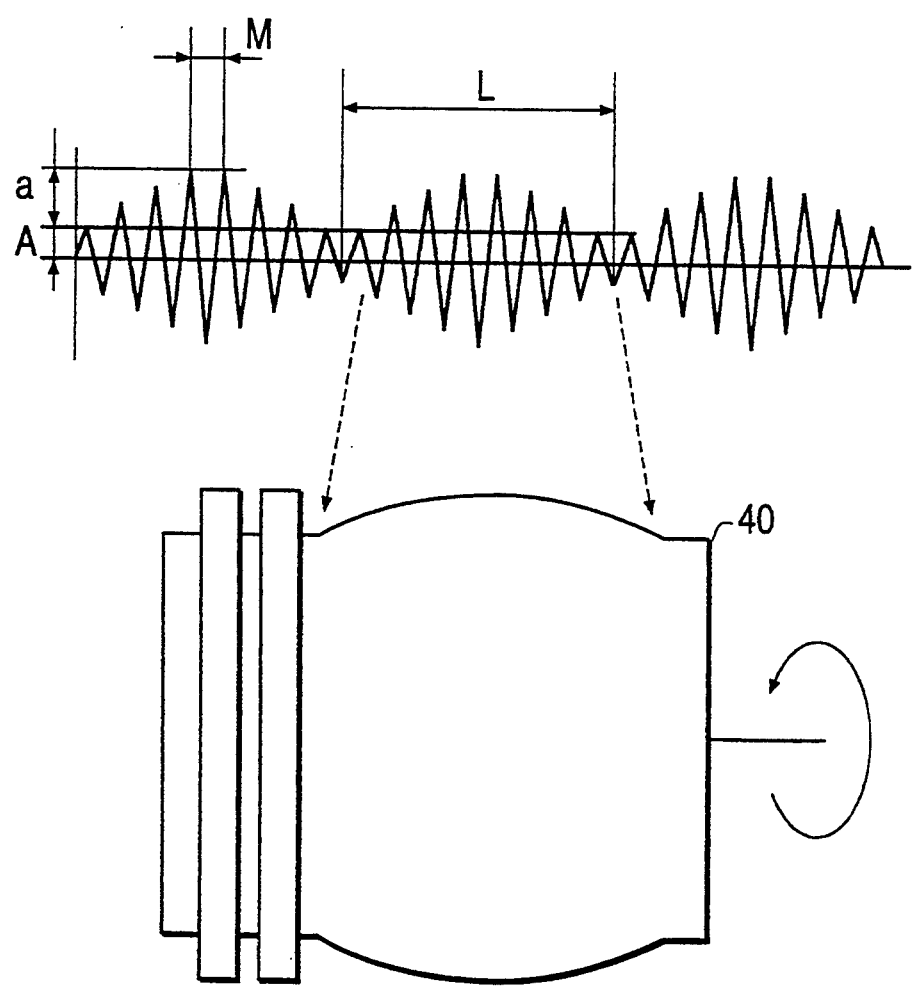
FIG. 6 is a schematic view exemplarily showing machining performed in accordance with a repetitive command supplied at intervals of a predetermined period and containing an asynchronous component generated at another period.

P is a move command supplied at intervals of a predetermined sampling period t for position and speed control of a servomotor. The command P is repeated by a short period M as shown in FIG. 6, and is a command asynchronous with the period M for repeating a determined pattern by a period L.

Figure 5:
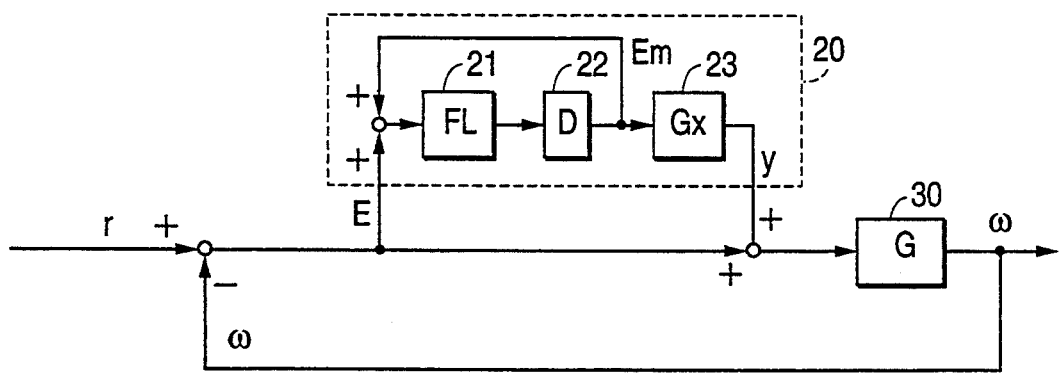
FIG. 5 (Prior Art) is a block diagram showing, by way of example, a principal part of servo motor control to which conventional repetitive control is applied.

An element 1 is a delay element, and generates an output p, which delays an input signal P by N sampling time periods determined depending on an order N, which is obtained by identifying a control object $G_0$. An element 2 is an integrator; K of an element 3 is a position gain; and $G_0$ of an element 4 is a transfer function of the control object, which includes a speed controller, servo motor, etc., and performs well-known PI (Proportional integration) control or the like. Further, numeral 5 denotes the same repetitive controller as the conventional repetitive controller shown in FIG. 5, and includes a bandpass limit filter FL, and a delay element D for storing data of one repetitive period M for the command P. That is, the repetitive controller has $M/t = m$ pieces of memories. Further included in the repetitive controller is a dynamic characteristic compensation element $G_X$ for compensating the characteristic of the transfer function $G_0$ of the control object. Numeral 6 denotes an inverse system feedforward controller, which inputs the command P and adds its output u to a speed command v for the servo motor.

A command p delayed from the command P by N periods is obtained by the delay element 1, and a deviation is determined by calculating the difference between the command p and a feedback amount $\omega$ indicative of a moved amount of the servo motor during the sampling period t. Further, a positional deviation $\epsilon$ is determined by integrating the deviation by the integrator 2. The positional deviation $\epsilon$ is supplied to the repetitive, controller 5.

For every predetermined sampling period t, the data d from the delay element D, which lags behind the sampling period by one period M, is added to the positional deviation $\epsilon$ for the bandpass limit filter processing, and stored in the delay element D. On the other hand, the output d from the delay element D is processed by the dynamic characteristic compensation element $G_X$, and is added to the positional deviation $\epsilon$ as a correction amount y. As a consequence, the positional deviation $\epsilon$ relative to a frequency spectrum of the period M is corrected so as to become zero, and the speed command v is determined by multiplying the corrected positional deviation ($\epsilon + y$) by the position gain K.

Meanwhile, the command P, as a future command, is inputted to the invert system feedforward controller 6. Thus inputted command is advanced by N sampling periods, because the command p is delayed by the N sampling periods by the delay element 1.

Figure 2:
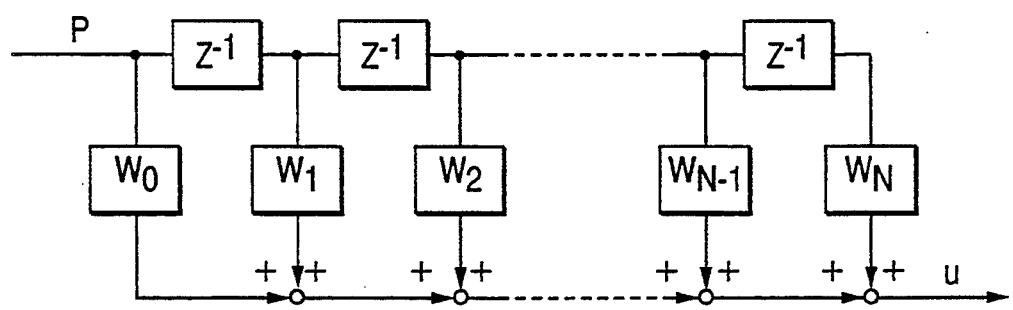
FIG. 2 is a configuration diagram of an inverse system controller employed in a predictive repetition apparatus according to the embodiment.

As shown in FIG. 2 in detail, the invert system feedforward controller 6 includes a FIR (Finite Impulse Responsive) type (non-recurrent type) digital filter of an N order. That is, there are provided N pieces of memories as delay elements $Z^{-1}$. In each sampling period t, the command P is stored in a first memory, and the command stored in each memory is shifted from left to right in FIG. 2, so that the commands P between a sampling point preceding the current sampling point by N sampling periods and the current sampling point are stored therein. In every sampling period t, the command P for the sampling time is multiplied by a coefficient $W_0$; a command preceding by sampling period and stored in the first memory is multiplied by a coefficient $W_1$; a command preceding by N-th sampling periods and stored in the N-th memory is multiplied by a coefficient $W_N$; and the thus multiplied values are added together to be outputted as an output u. That is, a transfer function IS of the invert system feedforward controller 6 is given as follows:

$$IS(Z) = [u(Z)/p(Z)]$$
$$= W_0 + W_1 Z^{-1} + W_2 Z^{-2} +$$
$$- W^{N-1} Z^{-(N-1)} + W_N Z^{-N}$$

Moreover, coefficients $W_i$ (i=0~N) are determined so as to become a reverse system of the control object $G_0$, and the transfer function IS of the reverse system feedforward controller 6 is so determined as to fulfill the following relationship.

$$IS=(Z^{-N}/G_0)$$

As a consequence, the moving amount $\omega$ of the servo motor can be determined by the equation $\omega = IS \cdot G_0 \cdot P$, and $p = Z^{-N}$. Therefore, an equation $\omega = IS \cdot G_0 \cdot (p/Z^{-N}) = p$ can be obtained. Therefore, we can notice that the positional deviation $\epsilon$ becomes extremely small. The small positional deviation $\epsilon$ is further corrected by an ordinary position loop and repetitive control processing to become an extremely small value, whereby highly accurate servo motor control can be achieved. The coefficients $W_0$ to $W_N$ are automatically determined by an adaptive algorithm to which the steepest descent method is applied, as will be described later.

Figure 3:
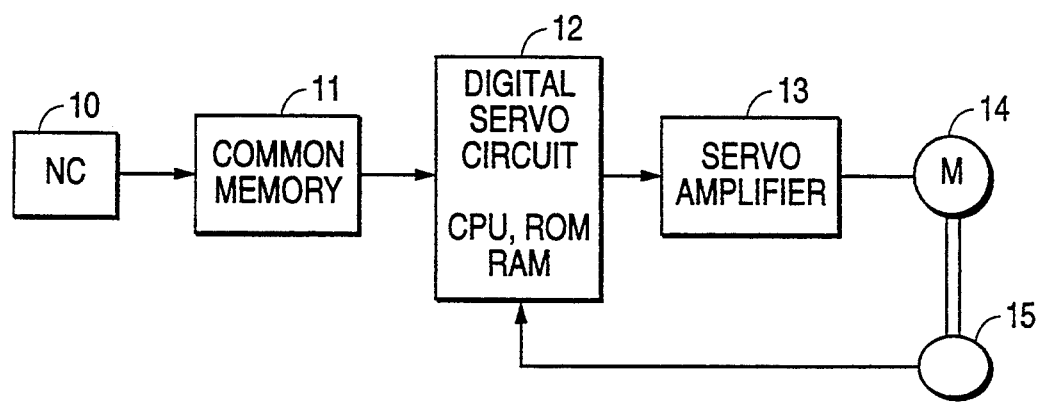
FIG. 3 is a block diagram of a digital servo device for carrying out a predictive repetition control method according to the embodiment.

FIG. 3 is a block diagram showing an embodiment of servo motor control applicable to a machine tool in carrying out the present invention.

In FIG. 3, reference numeral 10 denotes a numerical control unit for controlling the machine tool; 11, a common memory which receives the positional command. etc. outputted from the numerical control unit to the servo motor of the machine tool, and transmits it to a processor of a digital servo motor circuit 12; and 12, the digital servo motor circuit having the processor for executing the processing shown in FIG. 1 for the servo motor 14, as well as speed and current control processes. Reference numeral 13 denotes a servo amplifier including a transistor inverter, etc.; 14, a servo motor; and 15, a pulse coder which generates a determined number of feedback pulses per one rotation of the servo motor, and outputs the pulses to the digital servo circuit 12. Further, the digital servo circuit 12 includes by a processor, ROM, RAM, etc. The arrangement mentioned above has been well known as a digital servo circuit in a servo motor control for a machine tool, and thus its details are omitted here.

Figure 4B:
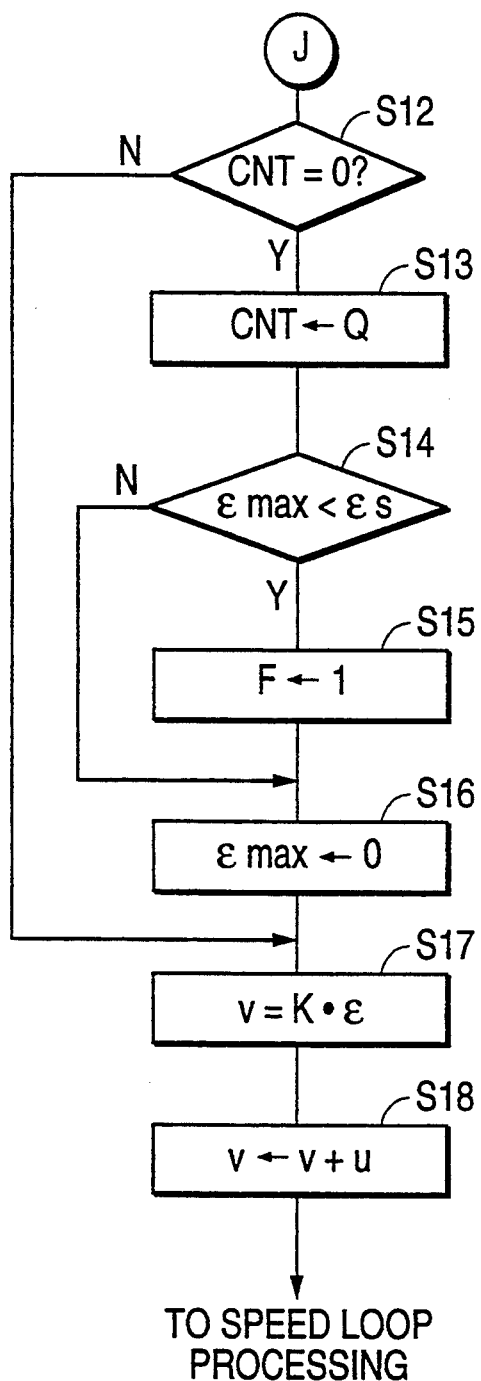
FIGS. 4 (A) and (B) are flowcharts of procedures to be processed by a processor of a digital servo circuit according to the embodiment.

When the machine is started after the order N, obtained by identifying the control object $G_0$, is set, the processor of the digital servo circuit 12 starts the processing shown in FIGS. 4 (A) and (B). The processor determines a move command P for each sampling period t on the basis of the move command transmitted from the numerical control unit 10 through the common memory 11 (step S1), executes a delay processing of the N sampling periods to determine a command p (step S2), and adds a value, which is to be obtained by substracting a feed back amount $\omega$ representing a moving amount of the servo motor during the sampling period t from the command p, to a register for storing the positional deviation $\epsilon$ in order to determine the positional deviation $\epsilon$ for the relevant sampling period (step 3).

Sequentially, it is determined whether or not a flag F is "1" (step S4). Since the flag F is initially "0", the sequence advances to step S5 where "1" is reduced from a counter CNT. Incidentally, a number Q obtained by dividing the predetermined period M by the sampling period t is initially set in the counter CNT. Further, it is determined whether or not an absolute value of the positional deviation $\epsilon$ determined at step S3 is larger than the maximum value $\epsilon$max (initially, $\epsilon$max=0) of the positional deviation stored in the register (step S6), and, if an absolute value of the detected positional deviation $\epsilon$ is larger than the maximum value, the value is stored in the register as $\epsilon$max (step S7). While, if the absolute value of the positional deviation $\epsilon$ is smaller than the maximum value, the sequence advances to step S8 without varying the value of $\epsilon$max of the register. The procedure of step S8 is a method for determining coefficients $W_0$ to $W_N$ for the N-th FIR type digital filter in accordance with the adaptive algorithm using the steepest descent method, in which a value, obtained by multiplying the positional deviation $\epsilon$ determined at step S3 by a command $P_i$ preceding by i sampling periods and stored in a command stack and a constant $\tau$ as a time constant, is added to coefficients $W_i$ (i=0 to N) preceding by one sampling period and stored in the register R ($W_i$)c, thereby determining each coefficient $W_i$. That is, each coefficient $W_i$ is determined by performing the following calculation. Incidentally, the coefficients $W_0$ to $W_N$ are initially set to "0" or an approximate value calculated so as to become $Z^{-N}/G_0$ with reference to the identified transfer function $G_0$ of the control object.

$$W_i = R(w_i) = \epsilon \cdot P_i \cdot \tau (i=0 \text{ to } N, P_0=P)$$

Thus determined respective coefficients $W_i$ are stored in the respective registers R ($W_i$) (step S9), and the output u of the invert system feedforward controller 6 is determined by executing the digital filter processing shown in FIG. 2 using the determined respective coefficients $W_i$. That is, the output u is obtained by the following calculation (step S10).

$$u = W_0 \cdot P + W_1 \cdot P_1 + W_2 \cdot P_2 + \ldots + W_N \cdot P_N$$

Next, the command stack is shifted (step S11). That is, $P_{N-1}, P_{N-2}, \ldots P_1, P$ are stored as $P_N, P_{N-1}, \ldots P_2, P_1$, respectively.

Then, it is determined whether or not the counter CNT is "0" (step S12). Since the counter is not "0" initially the sequence advances to step S17 where a speed command v is determined by multiplying the positional deviation $\epsilon$, determined at step S3, by the position gain K. Further, a corrected speed command v is determined by adding the output u of the reverse system feedforward controller 6, determined at step S10, to the speed command v (step S18). The speed command is transferred to a speed loop processing stage for execution. Subsequently, procedures of steps S1 through S12, S17 and S18 are executed for every sampling period, and, when a value of the counter CNT becomes "0" (step S12), a value Q (=M/t) obtained by dividing the predetermined period M by the sampling period t is set to the counter CNT (step S17). Further, it is determined whether or not the maximum positional deviation $\epsilon$max in one period M (sampling repeated Q times) is smaller than a predetermined setting value $\epsilon$s (step S14), and if not small, the sequence advances to step S16 where the register for storing the positional deviation $\epsilon$max is set to "0," and then, the sequence advances to step S17. Thereafter, the procedures mentioned above are repeated for every sampling period.

Further, the above procedures are repeated for every sampling period, and, when $\epsilon$max becomes smaller than the setting value $\epsilon$s, the sequence advances to step S15 where the flag F is set to "1". When the flag F is set to "1", procedures of steps 1 through 4 are executed, and the sequence advances from step S4 to step S19 in the next and subsequent sampling periods. Procedures of steps S5 through S9 are not executed, and, therefore, the values of coefficients $W_0$ through $W_N$ of the digital filter will not be changed. In the step S19, calculation of the repetitive controller 5 for the period M, in which commands are repeated in a conventional manner, is carried out to determine a correction value y. Further, a corrected positional deviation $\epsilon$ is determined by adding the positional deviation $\epsilon$ to the correction value y (step S20). Then, the sequence advances to step 10 wherein an output u of the reverse system feedforward controller 6 is determined on the basis of the fixedly determined coefficients $W_0$ through $W_N$. Next, the command stack is shifted (step S11). In step S12 the counter CNT is set to "Q" when the flag F is set to "1", and the counter will not be decremented thereafter, so that "Q" will be maintained. Therefore, the sequence advances from step S12 to S17. The output u of the invert feedforward controller 6 determined at step S10 is added to a value obtained by multiplying the positional deviation $\epsilon$ by the position gain K to determine a speed command v (steps S17 and 18). Thus determined speed command v is used for the speed loop processing. Subsequently, the aforementioned procedures of steps S1 through S4, S19, S20, S10 through S12, S17 and S18 are executed for every sampling period, whereby speed command v for the speed loop processing is determined.

In the foregoing embodiment, an example of control wherein a positional control loop provided with the repetitive controller 5 has been shown. However, almost the same effect can be obtained even when the repetitive controller is omitted. If the repetitive controller is not provided, however, the accuracy is slightly lowered than a case in which the controller is provided. In the case where no repetitive controller 5 is provided, it is not necessary to execute steps S19 and 20 in the procedures shown in FIGS. 4 and 5, so that the sequence advances from step S4 to step S10.

FIG. 6 shows an example of machining which is performed in accordance with a command including an asynchronous component of a period L to be repeated at intervals of period M. More specifically, employed in this machining example is a gradually variable profile command P(t) with which the difference between the major and minor axes of an elliptic section is gradually varied within a range from 1 mm to 1.4 mm. In this case, one rotation of a workpiece 40 is set to 40 msec, while a tool shaft makes two reciprocations (or moves along a path of the major axis—the minor axis—the major axis—the minor axis—the major axis) during one rotation of the workpiece, and therefore, a repetitive period M of the tool shaft is 20 msec. A profile variable period L is set to 3.2 msec. Therefore, the profile command P(t) for the tool shaft is given as follows:

$$P(t) = [A + a \cdot \sin\{(2\pi/L) \cdot t\}] \cdot \sin\{(2\pi/M) \cdot t\}$$
$$= [0.25 + 0.1 \cdot \sin\{(2\pi/3.2) \cdot t\}] \cdot \sin\{(2\pi \cdot 50t)\}$$

Figure 7:
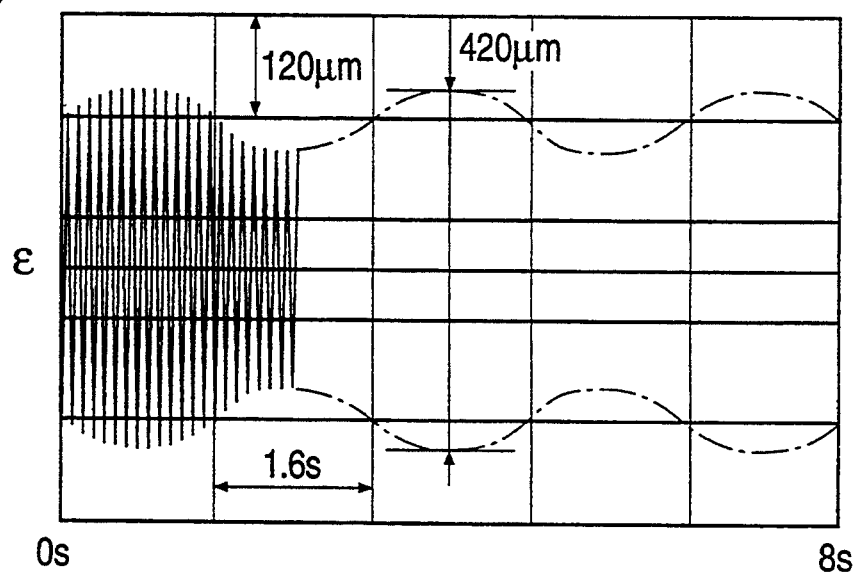
FIG. 7 is a diagram showing a result of simulation according to a conventional servo motor control.
Figure 8:
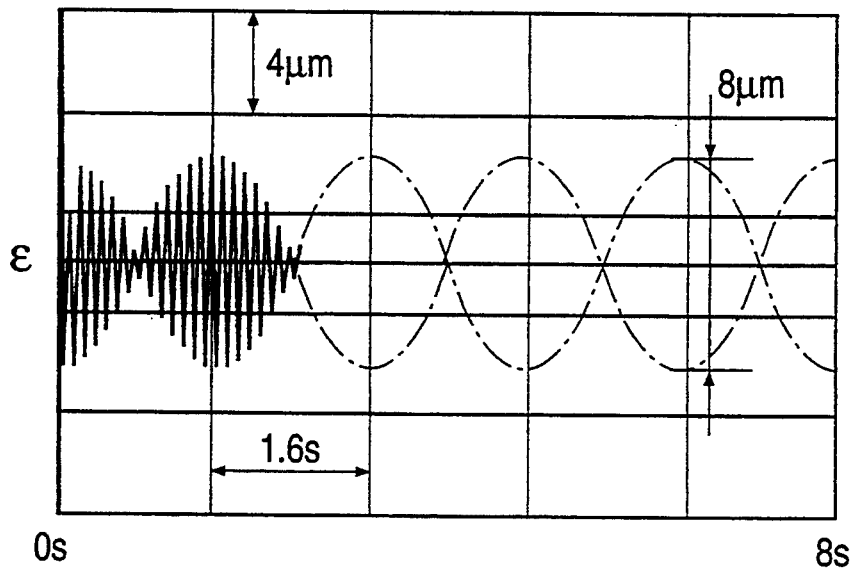
FIG. 8 is a diagram showing a result of simulation according to a conventional repetitive control shown in FIG. 5.
Figure 9:
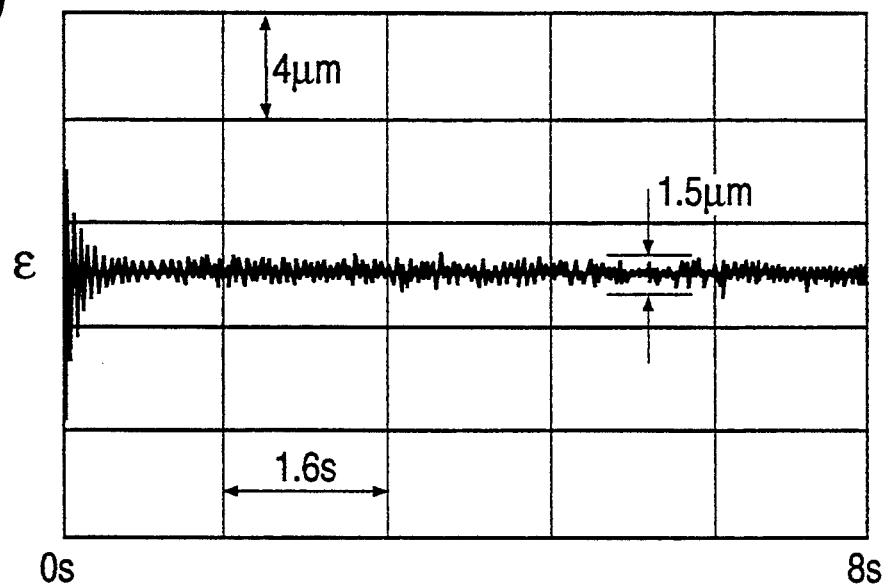
FIG. 9 is a diagram showing a result of simulation according to a predictive repetition control provided with the repetitive controller and inverse system feedforward controller of the present invention.

Simulations of machining using the profile command P(t) were executed with respect to a conventional servo motor control system, a servo motor control system to which a repetitive control system is applied, a system provided with the repetitive controller of the present invention, and a predictive repetition control system with no repetitive controller. FIG. 7 shows the result of simulation associated with the conventional servo motor control system. In this case, the maximum value of the positional deviation $\epsilon$ is 420 $\mu$m. FIG. 8 shows the result of simulation associated with the conventional repetitive control system shown in FIG. 5, in which the maximum value of the positional deviation $\epsilon$ is 8.0 $\mu$m. FIG. 9 shows the result of simulation associated with the predictive repetition control provided with the repetitive controller 5 and the inverse system feedforward controller 6 of the present invention. In this case, the maximum value of the positional deviation $\epsilon$ is 1.5 $\mu$m. This indicates that the positional deviation can be reduced to an extremely small value.

Figure 10:
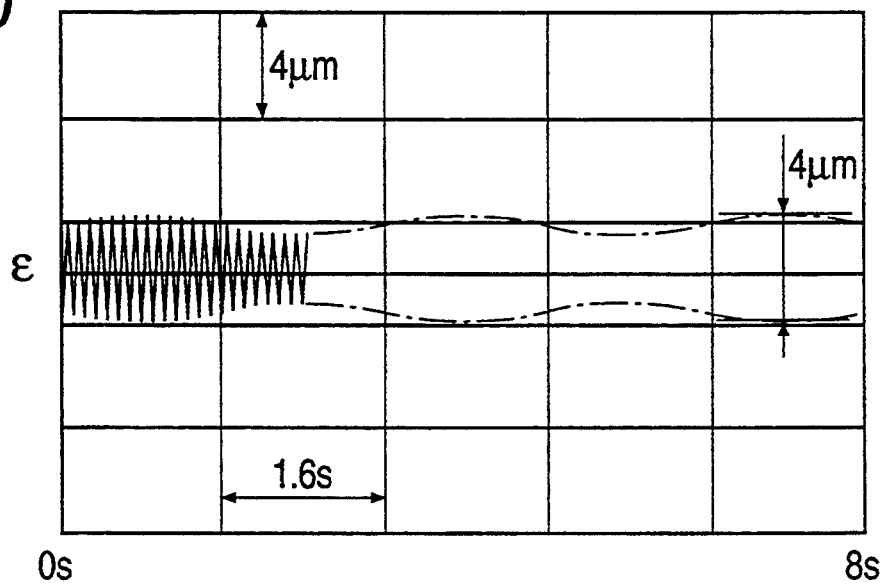
FIG. 10 is a diagram showing a result of simulation according to the predictive repetition control, in which only the inverse system feedforward controller 6 of the present invention is added.

Moreover, FIG. 10 shows the result of simulation, effected under the identical conditions with those of the embodiment of the present invention provided only with the inverse system feedforward controller 6 without including the repetitive controller 5. In this case, the maximum value of the positional deviation $\epsilon$ is 4 $\mu$m. Therefore, the positional deviation $\epsilon$ becomes smaller compared with the case shown in FIG. 7 associated with the conventional control system and with the case shown in FIG. 8 provided only with the repetitive controller, although it becomes larger compared with the case shown in FIG. 9 provided with the repetitive controller 5.

We claim:

1. A predictive repetition control method for a servo motor to be controlled in accordance with a move command repeatedly supplied at intervals of a predetermined period, comprising the steps of:

providing a feedforward controller, including a FIR-type digital filter, which functions as an inverse system for a control object;

inputting to the feedforward controller a future move command having a degree of advancement determined in accordance with an order of the control object;

determining a positional deviation between a delayed said future move command and a position feedback amount;

inputting said determined positional deviation to said feedforward controller;

automatically determining coefficients of said FIR-type digital filter in said feedforward controller by adaptive control based on said inputted future move command and said inputted determined positional deviation; and adding an output from the feedforward controller to a move control output determined based on the delayed future move command.

2. A predictive repetition control method for a servo motor according to claim 1, further including a repetitive controller, wherein the output of the feedforward controller is added to a move control output calculated from the move command by position loop processing and repetitive controller processing.

3. A predictive repetition control method for a servo motor, using control apparatus for controlling a servo motor in accordance with a move command P repeatedly supplied at intervals of a predetermined period, comprising the steps of:

receiving the move command P to generate an output p delayed from the move command P by N sampling time periods, which are determined by an order N obtained by identifying a control object $G_0$;

executing processing of a feedback controller to generate a first control output v on the basis of the output p and a feedback deviation amount $\epsilon$ associated with a moving amount of the servo motor;

providing a feedforward controller including a FIR-type digital filter;

determining said feedback deviation amount $\epsilon$ based on a positional deviation between the output p and a position feedback amount $\omega$;

executing processing of said feedforward controller to receive the move command P and the feedback deviation amount $\epsilon$, to automatically determined coefficients of said FIR-type digital filter by adaptive control based on said received move command P and said feedback deviation amount $\epsilon$ and to generate a second control output u as a transfer function $Z^{-N}/G_0'$ which functions as an inverse system for the control object; and controlling the moving amount of the servo motor on the basis of the first and second control outputs.

4. A predictive repetition control method for a servo motor according to claim 3, further including a step of executing repetitive controller processing, wherein the output of the feedforward controller processing is added to a move control output calculated from the move command by position loop processing and the repetitive controller processing.

5. A predictive repetition control apparatus for controlling a servo motor in accordance with a move command repeatedly supplied at intervals of a predetermined period, comprising:

delay means for receiving a move command P and for generating an output p delayed from the move command P by N sampling time periods, which are determined by an order N obtained by identifying a control object $G_0$;

feedback detecting means for determining a feedback amount $\omega$ associated with a moving amount of the servo motor;

feedback control means for generating a first control output v on the basis of the output p from the delay means and the feedback amount $\omega$ from the feedback detecting means;

deviation means for determining a positional deviation $\epsilon$ between the output p and the feedback amount $\omega$;

feedforward control means, including a FIR-type digital filter, for receiving the move command P and the determined positional deviation $\epsilon$, for automatically determining coefficients of said FIR-type digital filter based on said received move command P and determined positional deviation $\epsilon$, and for generating a second control output u as a transfer function $Z^{-N}/G_0$ which functions as an inverse system for the control object; and moving amount control means for controlling the moving amount of the servo motor on the basis of the first and second control outputs.

6. A predictive repetition control apparatus for a servo motor according to claim 5, further including a repetitive control means, wherein the output of the feedforward control means is added to a move control output calculated from the move command by position loop processing and processing of the repetitive control means.

* * * * *